United States Patent
Ueda et al.

(10) Patent No.: US 8,465,165 B2
(45) Date of Patent: Jun. 18, 2013

(54) METHOD FOR PRODUCING DISPLAY MEMBER AND MOLDED PRODUCT FOR DISPLAY MEMBER

(75) Inventors: Masaki Ueda, Yokkaichi (JP);
Masatomo Inoue, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 84 days.

(21) Appl. No.: 13/125,748

(22) PCT Filed: Jan. 28, 2010

(86) PCT No.: PCT/JP2010/051078
§ 371 (c)(1),
(2), (4) Date: Apr. 22, 2011

(87) PCT Pub. No.: WO2010/109942
PCT Pub. Date: Sep. 30, 2010

(65) Prior Publication Data
US 2012/0015580 A1    Jan. 19, 2012

(30) Foreign Application Priority Data
Mar. 27, 2009   (JP) .................. 2009-079448

(51) Int. Cl.
*G09F 13/00* (2006.01)
*F21V 33/00* (2006.01)
*B29C 45/14* (2006.01)
*B29C 45/00* (2006.01)

(52) U.S. Cl.
USPC .............. 362/28; 362/23; 362/812; 362/97.1; 362/85; 264/259; 264/513; 264/328.1

(58) Field of Classification Search
USPC .............. 362/23–30, 471, 488–492, 85, 97.1, 362/97.4, 116, 812; 264/259, 260, 271.1, 264/328.1–328.19, 510–516
See application file for complete search history.

(56) References Cited

U.S. PATENT DOCUMENTS

| | | | | |
|---|---|---|---|---|
| 5,477,024 A | * | 12/1995 | Share et al. | ................... 264/132 |
| 5,562,928 A | * | 10/1996 | Ando et al. | ................ 264/328.8 |
| 2005/0264889 A1 | | 12/2005 | Gotoh et al. | |

FOREIGN PATENT DOCUMENTS

| | | |
|---|---|---|
| JP | U 6-38127 | 5/1994 |
| JP | A-07-205214 | 8/1995 |
| JP | A-07-283256 | 10/1995 |
| JP | A-2005-338499 | 12/2005 |
| WO | WO 2008/026560 | 3/2008 |

OTHER PUBLICATIONS

Mar. 23, 2010 International Search Report issued in PCT/JP2010/051078.

* cited by examiner

*Primary Examiner* — Mariceli Santiago
(74) *Attorney, Agent, or Firm* — Oliff & Berridge, PLC

(57) ABSTRACT

A method for producing a display member that can restrain lights from leaking from a remainder chip of a runner and a portion around the remainder chip. The method includes laminating a transparent layer on a light-diffusing layer; forming slant surfaces each having an slant angle of more than 45 degrees with respect to an extending direction D of a runner, the slant surfaces being provided around a portion on the rear surface of the transparent layer to which the runner is connected and being inclined cutting out the runner at a position along and near the slant surfaces; and forming a shielding layer on a remainder chip of the runner and on a rear surface of the display member main body inside the remainder chip by spraying a light-shielding material onto a front surface of the display member main body and a side part of the remainder chip.

5 Claims, 8 Drawing Sheets

METHOD FOR PRODUCING DISPLAY MEMBER AND MOLDED PRODUCT FOR DISPLAY MEMBER

The present application is the national phase of PCT/JP2010/051078, filed Jan. 28, 2010, which claims priority to Japanese Patent Application No. 2009-079448, filed Mar. 27, 2009.

BACKGROUND

The exemplary embodiments described herein detail for illustrative purposes and are subject to many variations in structure and design. It should be emphasized, however, that the present invention is not limited to a particularly disclosed embodiment shown or described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "an" and "an" herein do not denote a limitation of quantity, but rather denote the presence of at least one of the referenced item. This disclosure generally relates to a method for producing a display member for an operation button or the like mounted on various kinds of equipments such as an instrument panel or an audio unit for a motor vehicle and relates to a molded product for the display member formed by using a mold.

Recently, a display panel to be mounted on various kinds of equipments such as an instrument panel or an audio unit for a motor vehicle is often provided with an illuminating function on a display section such as characters or figures in order to secure visibility during the night.

A display member provided with such illuminating function has been disclosed in, for example, Patent Document 1. The display member disclosed in Patent Document 1 ("an illuminating key 5" in Patent Document 1) includes a main body made of a resin or the like having light permeability. A painted layer made of a light-shielding paint is applied to a surface on the main body. A part of the painted layer is stripped from the surface on the main body in a manner of a suitable shape. When lights are emitted onto a rear side of the display member, the lights are permitted to pass to a front side of the display member through only an unpainted portion from which the painted layer is stripped. Consequently, it is possible for a user to clearly recognize the shape of the unpainted portion during the night.

However, there is a problem that this display member will be subject to constrains in selection of color on the unpainted portion or the display portion under a non-illumination condition by the following reasons.

Firstly, if a display member main body is completely transparent, there are problems that a difference in brightness between a portion near a light source and a portion remote from the light source becomes remarkable and a part outside an illuminating area may be a see-through shadow due to a visual angle. Accordingly, in order to restrain the uneven brightness caused due to the visual angle on the unpainted portion or the display portion to perform uniform illumination, it is preferable that a material of the display member main body has a light-diffusing function. Specifically, an acrylic resin or an ABS resin that is turned cloudy in milk white is most preferable.

On the other hand, since a surface on the unpainted portion on the display member main body is exposed as it is, a color of the unpainted portion becomes the same as that of the display member main body itself during the daytime when illumination is not effected. It is preferable that a color of a portion to be illuminated can be clearly distinguished from a color of the painted layer. For example, in the case where the color of the painted layer is relatively pale, it is required that the color of the display member main body is selected to be a black-based color. Also, on the matter of design, there is a case where the color of the unpainted portion is desired to be a particular color.

However, as described above, materials of the display member main body are limited, if the material has the light-diffusing function. Under this situation, the color of the display member main body, that is, the color of the unpainted portion during a non-illumination time is subject to considerable constraints. For example, in the case where the acrylic resin or the ABS resin that is turned cloudy in milk white is used for the display member main body, the color of the display member main body is limited to a white-based color by itself.

That is, if a uniform illumination is desired on the conventional display member, there is a problem that a selection of a color on the unpainted portion or the display portion during non-illumination time is remarkably limited.

In order to overcome the above problems, for example, Patent Document 2 has proposed a display member 100 as shown in FIG. 9 (a front elevation view) and FIG. 10 (a rear side elevation view). The display member 100 includes a translucent display member main body 101 and a light-shielding layer 103 for covering an area on a front surface of the display member main body 101 except a particular display section 102. When lights are emitted onto a rear side of the display member main body 101, the lights pass the area on which the light-shielding layer 103 is not provided and illuminates the front surface of the main body 101.

The display member main body 101 comprises a light-diffusing layer 106 and a transparent layer 105 that are laminated on each other. The light-diffusing layer 106 has a light-diffusing effect and is disposed on a rear side of at least the particular section 102 to cover it. The transparent layer 105 is disposed on a front side of the light-diffusing layer 106, has a higher transparency than that of the light-diffusing layer 106, and is colored with a particular color.

The lights emitted onto the rear side of the display member main body 101 of the display member 100 pass the light-diffusing layer 106 and transparent layer 105 on the display member main body 101, further pass only the display section 102, on which the light-shielding layer 103 is not provided, and come out from a front side of the display section 102. Accordingly, the shape of the display section 102 is clearly illuminated and a uniform illumination having no uneven brightness can be realized by a light-diffusing effect of the light-diffusing layer 106. In addition, even if the color on the light-diffusing layer 106 is limited (for example, even if the light-diffusing layer is made cloudy in milk white), it is possible to set the color of the display member main body 101 during a non-illustrating time (that is, a color on the portion on which the light-shielding layer 103 is not provided) to be a desired color or a color similar to the desired color.

However, the display member 100 has the following problems with respect to a matter in production.

The display member 100 is produced by the following steps. Firstly, as shown in FIG. 11, the light-diffusing layer 106 is formed primarily by using a mold (not shown) and the transparent layer 105 is formed secondly by using the mold.

The layers 105 and 106 are integrated with each other to form the display member main body 101. Then, the display member main body 101 is removed from the mold and a runner coupled to the transparent layer 5 is cut out. A light-shielding material is sprayed onto display member main body 101 from a front side of the main body 101 (a side of the transparent layer 105) and a side surface perpendicular to the front side (an outside of at least the portion from which the runner is removed) to form the light-shielding layer 103.

In the above producing steps, the runner 104, for example, as shown in FIGS. 11 and 12, includes a proximal end 104a connected to a rear surface of the outer transparent layer 105 on the display member main body 101, and a distal end 104b that extends outward from the proximal end 104a in a direction substantially perpendicular to a bottom surface 105a of the transparent layer 105. The runner 104 has a substantially uniform area in cross section from a lower side of the proximal end 104a to the distal end 104b. The runner 104 is cut out by a cutting means such as a nipper. However, as shown in FIG. 13, a part of the proximal end 104a remains in the transparent layer 105. In addition, since the runner 104 is cut out along the bottom surface 105a of the transparent layer 105 in a direction perpendicular to the runner 104, a remainder chip 104c from the proximal end 104a projects backward greatly from the rear side of the proximal end 104a and interferes with a painting step of the light-shield layer 103. Consequently, faults of painting will be caused on an inner part surface (an upper surface) A of the remainder chip 104c and on a rear surface B of the transparent layer 105 located at a further inner part from the remainder chip 104c. This will cause a problem that a portion having no light-shielding layer 103 remains. This will be caused by spraying the paint onto the remainder chip 104c from its outside in order to form the light-shielding layer 103.

Such remainder chip 104c and faults of the light-shielding layer 103 on the transparent layer 105 will permit the lights to leak from remainder chip 104c of the runner 104 and the transparent layer 105 regardless of the fact that the remainder chip 104 and the faults are different parts from the display section 102 itself. This will be a cause of impeding a suitable display.

Patent Document 1: JUM HEI 6 (1994)-38127 CD-ROM
Patent Document 2: JP 2005-338499A

SUMMARY

In view of the above problems, a first object of exemplary embodiments is to provide a method for producing a display member that includes a display member main body having a transparent layer at a display side of the main body and a light-diffusing layer at a rear side of the main body, and a light-shielding layer formed on a front side of the main body except a display window. A second object of exemplary embodiments is to provide a method for producing a display member that can restrain lights from leaking from a runner remainder chip and portions in the vicinity of the remainder chip. A third object of exemplary embodiments is to provide a molded product for a display member suitable for the method for producing the display member.

A method for producing a display member in accordance with exemplary embodiments comprises the steps of: molding a transparent layer by injecting a resin into a mold having a gate through the gate under a condition that a member constituting a light-diffusing layer is disposed in the mold, and providing the transparent layer with slant surfaces each having an slant angle of more than 45 degrees with respect to an extending direction of a runner that extends sideward from a rear surface of the transparent layer in correspondence with the gate, the slant surfaces being provided around a portion on a rear surface of the transparent layer to which the runner is connected and being inclined so that an inner side end of each of the slant surfaces is located at a rear side from an outer side end of the portion; removing the display member main body from the mold, and cutting out the runner at a position along and near the slant surfaces by using a cutting means having a pair of blades that rotate about a common axis; and forming a shielding layer on at least a front surface of the display member main body and on a rear surface of the transparent layer inside a remainder chip of the runner by spraying a light-shielding material except the display window from a front side of the display member main body and a direction parallel to the extending direction of the runner.

DETAILED DESCRIPTION OF EMBODIMENTS

An exemplary apparatus for an electrical junction box is described herein. The present specification discloses the components and various exemplary methods of manufacturing the components for their application and implementation. In the following description, for purposes of explanation, numerous specific details are set forth in order to provide a thorough understanding of the disclosed electrical junction box. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places of the specification are not necessarily all referring to the same embodiment.

Figure 1:
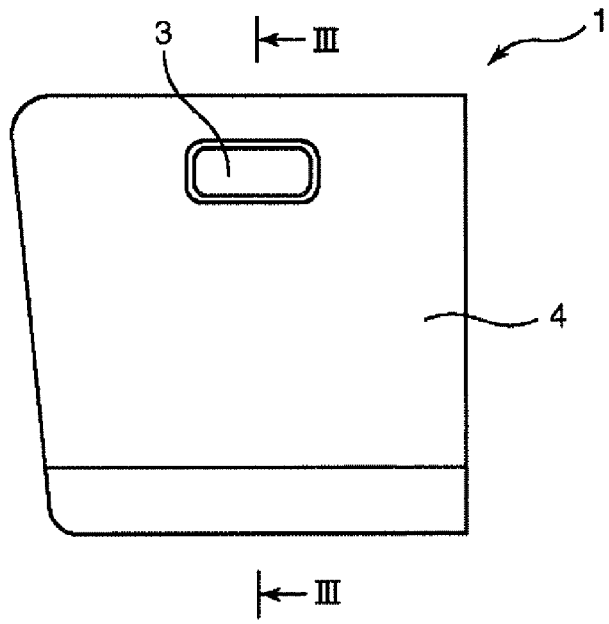
FIG. 1 is a front elevation view of an embodiment of a display member in accordance with the present invention.
Figure 2:
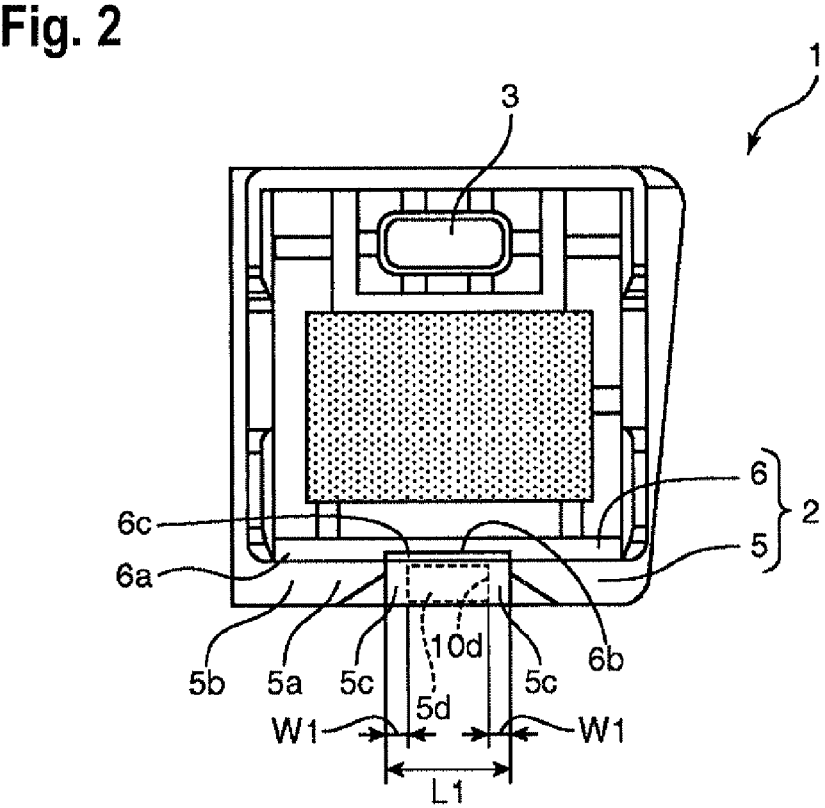
FIG. 2 is a rear side elevation view of the display member shown in FIG. 1.
Figure 3:
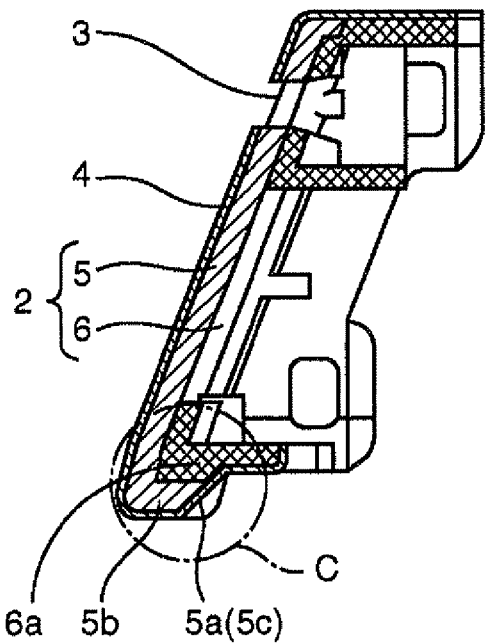
FIG. 3 is a cross section view of the display member taken along lines III-III in FIG. 1.
Figure 4:
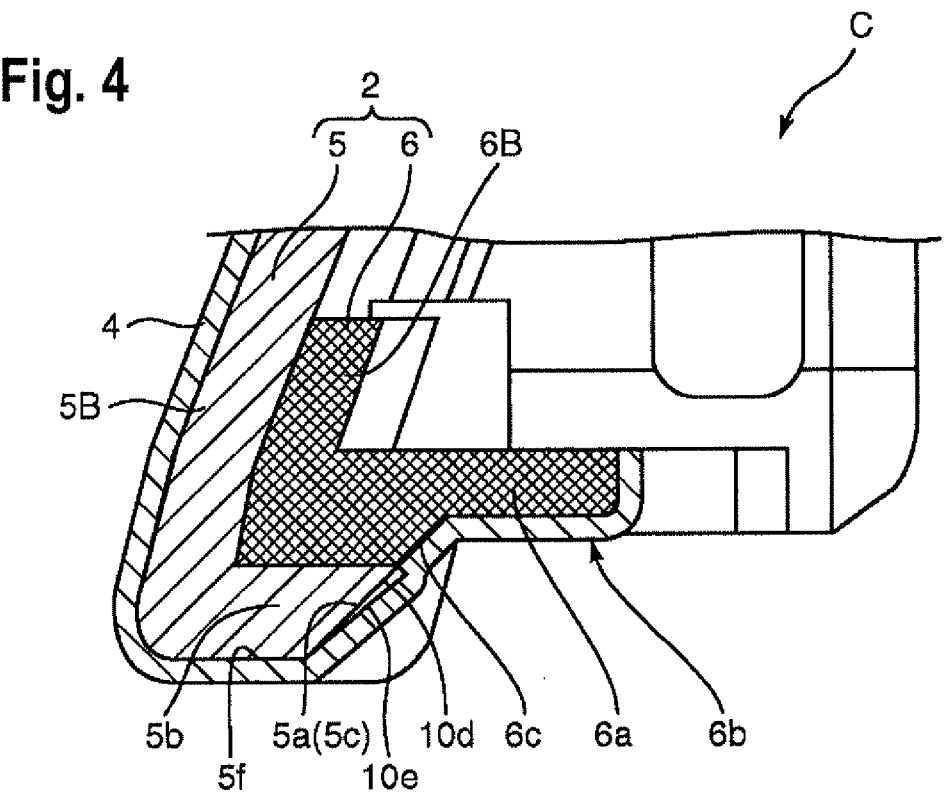
FIG. 4 is an enlarged cross section view of the display member taken from a part C in FIG. 3.
Figure 5:
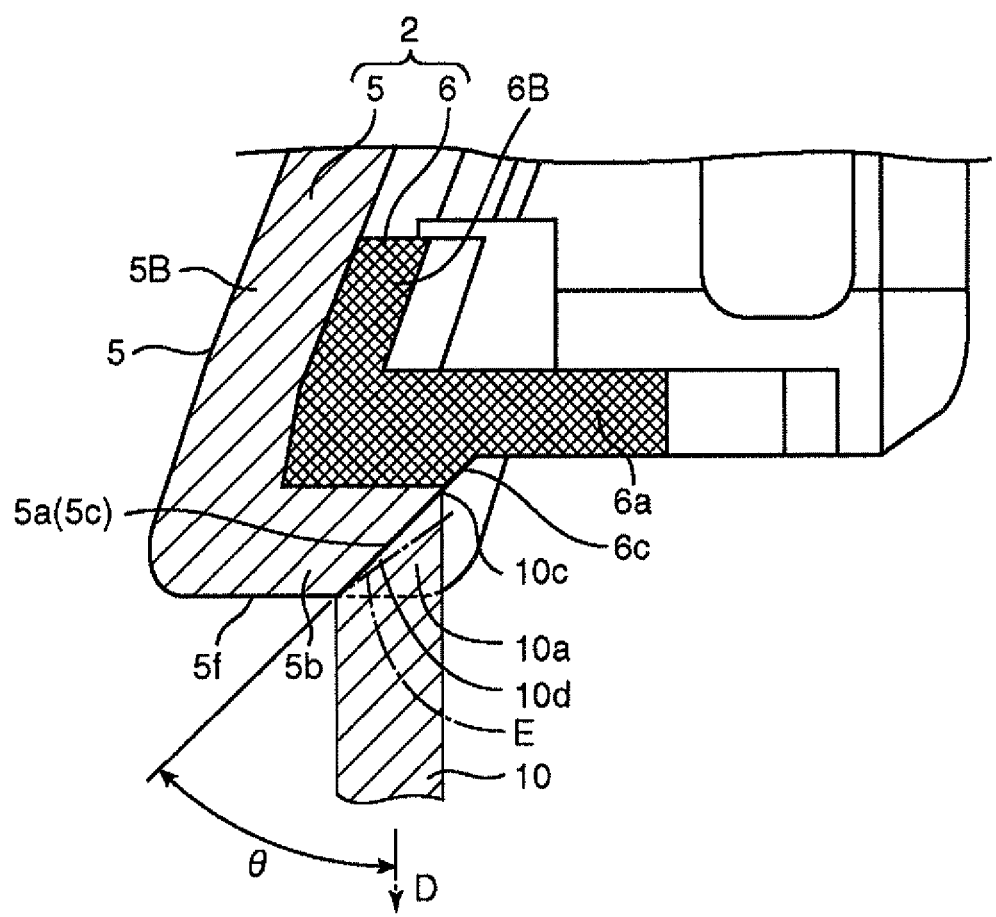
FIG. 5 is an enlarged cross section view of the display member similar to FIG. 4, illustrating the display member before a runner is cut out from the display member.
Figure 6:
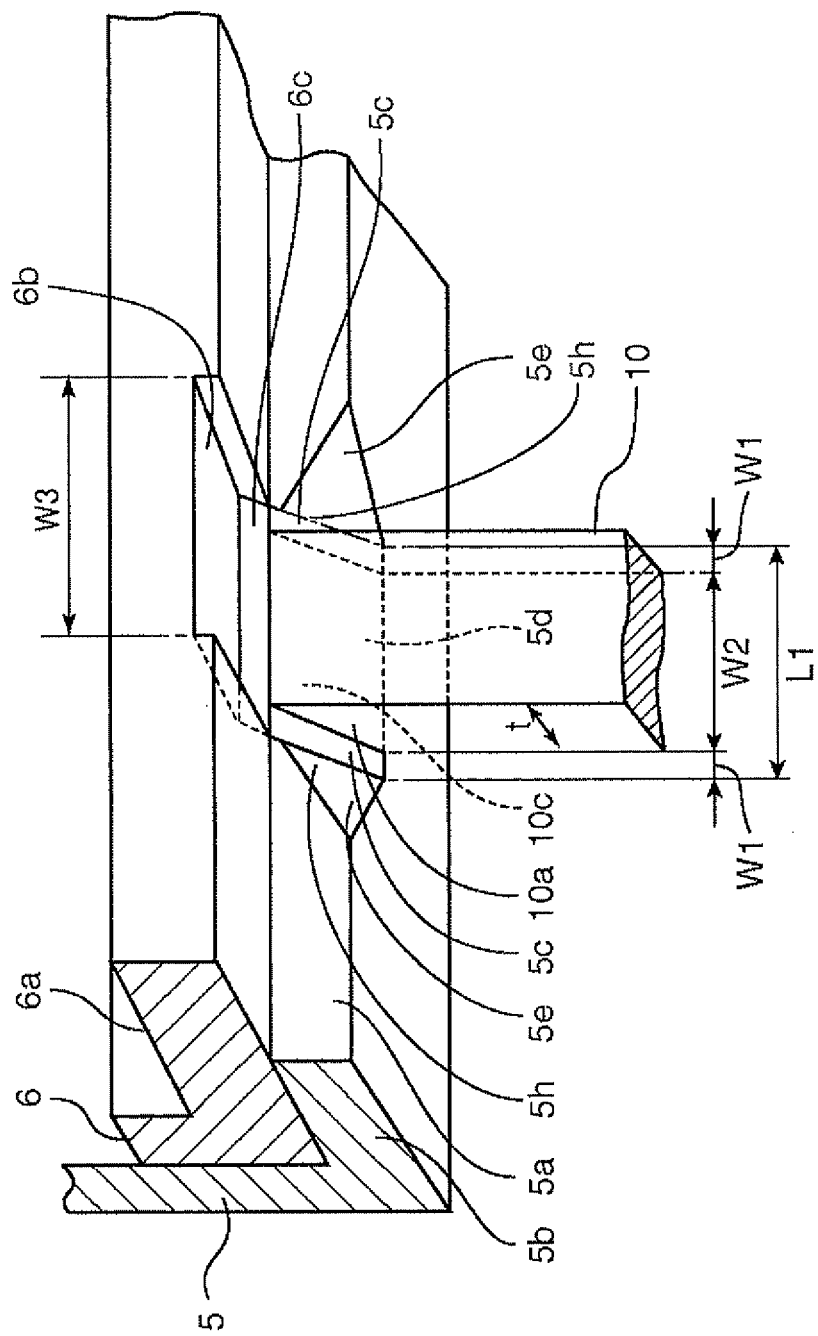
FIG. 6 is a perspective view of the display member taken upward in a slanting direction in FIG. 5, illustrating the display member before the runner is cut out from the display member.

FIG. 1 is a front elevation view of an embodiment of a display member in accordance with the present invention. FIG. 2 is a rear side elevation view of the display member shown in FIG. 1. FIG. 3 is a cross section view of the display member taken along lines III-III in FIG. 1. FIG. 4 is an enlarged cross section view of the display member taken from a part C in FIG. 3. FIG. 5 is an enlarged cross section view of the display member similar to FIG. 4, illustrating the display member before a runner is cut out from the display member. FIG. 6 is a perspective view of the display member taken upward from a slant angle in FIG. 5, illustrating the display member before the runner is cut out from the display member.

A display member 1 is used as, for example, an operation button for an audio unit to be mounted on a motor vehicle. The display member 1 includes a transparent display member main body 2 and a light-shielding layer 4 for covering a front surface of the display member main body 2 except a particular display section 3. When the display member main body 2 is pressed backward on the operation button, lights are emitted onto the display member main body 2 from it rear side, and the particular section 3 in the display member 1 is illuminated at a front side to display an on-operation. The light-shielding layer 4 is made of a paint having a light-shielding function.

The display member main body 2 includes a transparent layer 5 located at a side (a front side) of the light-shielding layer 4 and a light-diffusing layer 6 located at a opposite side (a rear side) from the light-shielding layer 4 to dispose the transparent layer 5 between the layers 4 and 6.

The transparent layer 5 is made of a transparent resin such as an acrylic resin or a polycarbonate resin. The transparent layer is colored in a suitable concentration by mixing the transparent resin and a suitable colored (for example, black) particles. The transparent layer 5 has a higher transparency than that of the light-diffusing layer. The light-diffusing layer 6 has a function of diffusing the lights in the whole display member 1. The light-diffusing layer is preferably made of, for example, a mixture of a light-diffusing agent particles and a transparent resin such as an acrylic resin or a polycarbonate resin to make the mixture cloudy in milk white, or of a material that is cloudy in milk white intrinsically.

The transparent layer 5 is formed into a substantially L-shaped configuration in cross section that has a main body portion 5B and a projecting portion 5b that protrudes backward from a lower end of the main body portion 5B. The portions 5B and 5b are integrated with each other. The projecting portion 5b extends in right and left directions (in a width direction) and has a rear surface 5a directed backward from the projecting portion 5b. The rear surface 5a is provided on a central part in the width direction with a runner-connected portion 5d to which a runner 10 is coupled during a producing process described after, and with cutter blade-inserting slant surfaces 5c at both sides of the runner-connected portion 5d in the width direction. The cutter blade-inserting slant surfaces 5c serve to receive a pair of blades of a nipper so that the blades can slide along the slant surfaces 5c inward from a side of the display member main body 2 in order to cut the runner 10. Each of the cutter blade-inserting slant surfaces 5c has a width W1 (see FIGS. 2 and 6) larger than a width of a single blade of the nipper. A distance L1 (see FIGS. 2 and 6) between outer side edges 5h of the cutter blade-inserting slant surfaces 5c is set to be a given value. Each of the cutter blade-inserting slant surfaces 5c is formed so that an inner part side edge (an upper side edge) protrudes backward from an outer side edge (a lower side edge). A slant direction of each cutter-inserting slant surface 5c will be described after in detail.

Each of the cutter blade-inserting slant surfaces 5c is provided on an outer side with a slant cut-out shape or a substantially triangular surface 5e that is formed by cutting out each boundary corner defined between the slant surface 5c and an outer side edge of the slant surface 5c. One edge (an inner edge) of each triangular surface 5e accords with an outer side edge 5h of each cutter blade-inserting slant surface 5c.

The runner 10 is formed when a resin is injected into a mold. However, the runner 10 is not necessary for the display member 1. The runner 10 is cut out at the proximal end 10a connected to the rear surface 5a of the projecting portion 5b after the runner 10 is formed so as to extend from a part between the cutter blade-inserting slant surfaces 5c in a given extending direction D (see FIGS. 5 and 8). However, a part of the runner 10 remains on the transparent layer 5 as a remainder chip 10d.

As shown in FIGS. 4 and 5, the light-diffusing layer 6 is formed into a substantially L-shaped configuration in cross section that has a main body portion 6B and a projecting portion 6a that protrudes backward from a lower end of the main body portion 6B, as is the case with the transparent layer 5 described above. The portions 6B and 6a are integrated with each other. The projecting portion 6a is provided on an upper side (an inner side) of the projecting portion 5b of the transparent layer 5 and protrudes backward over the projecting portion 5b.

The projecting portion 6a is located at an upper side (an inner side) over the proximal end 10a of the runner 10. The projecting portion 6a is provided in a bottom surface at a central part in right and left directions with a recess 6b concaved upward. The recess 6b has a width W3 that is same as the distance L1. A rear end of the recess 6b accords with a rear end of the light-diffusing layer 6 and is open backward. On the other hand, a front side surface of the recess 6b has a width W3, is inclined by the same angle as that of each of the cutter blade-inserting slant surfaces 5c so as to be connected to the slant surface 5c, and serves as an access permission slant surface 6c that can permit a distal end (an end opposite from a handle) of a nipper described after so as to slide on the front side surface. Specifically, each cutter-inserting slant surface 5c and each access permission slant surface 6c are inclined by an angle θ (theta) of more than 45 degrees with respect to the extending direction D of the runner 10 (see FIG. 5). The direction of the slant angle is set so that an upper edge (an inner side end) of the rectangular cutting blade-inserting slant surface 5c is located at a rear side from a lower edge (an outer side end) of the slant surface 5c and so that an upper edge (a bottom side end of the recess 6b) of the rectangular access permission slant surface 6c is located at a rear side from a lower edge (a lower side end of the recess 6b) of the slant surface 6c.

The light-shielding layer 4 is formed on the front surface of the display member main body 2 constructed above except the particular display section 3 and is formed also on a side surface continued to the front surface. That is, in the present embodiment, there is no portion on which the light-shielding layer 4 is not formed on the remainder chip 10d of the runner 10, cutting blade-inserting slant surface 5c, and access permission slant surface 6c. Also, there is no portion on which the light-shielding layer 4 is not formed on a front surface (except the display section 3) of the transparent layer 5, an outward exposed surface at a side part of the transparent layer 5, and an outward exposed surface of the projecting portion 6a of the light-diffusing layer 6.

Next, an embodiment of a method for producing the display member will be described below.

(1) Formation of a Molded Product for a Display Member

Figure 7:
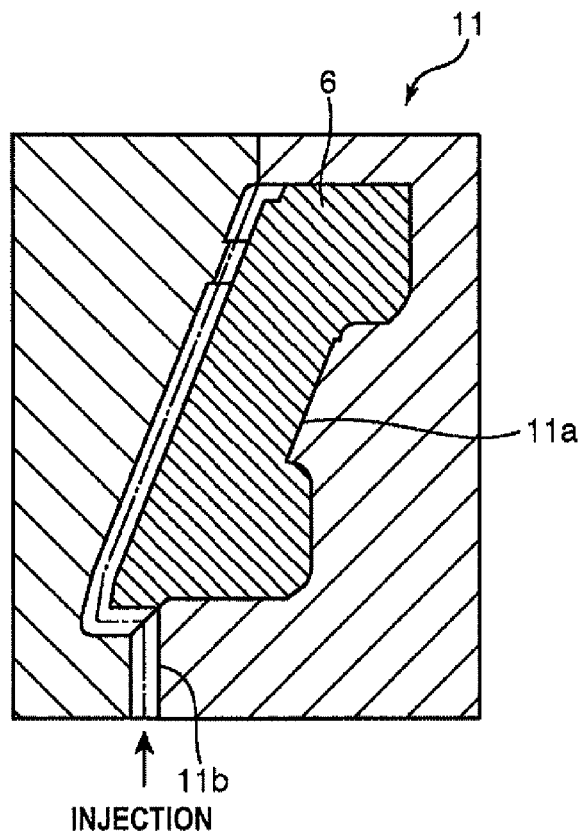
FIG. 7 is an explanatory view of a process for molding a display member main body by using a mold in the method of present invention.

As shown in FIG. 7, the transparent layer 5 and light-diffusing layer 6 are integrally molded in a manner of two-colored formation by using, for example, a mold 11 to produce a molded product for a display member. Specifically, firstly the light-diffusing layer 6 is molded primarily and then the transparent layer 5 is molded secondly. The molded product for the display member molded above includes the display member main body 2 and the runner 10 connected to the main body 2.

The mold 11 includes a interior cavity 11a and a gate 11b for injecting a molding resin into the interior cavity 11a. The interior cavity 11a is formed into a configuration that can form the cutter blade-inserting slant surfaces 5c on the rear surface 5a on the projection portion 5b of the transparent layer 5 and can form the access permission slant surface 6c connected to the cutter blade-inserting slant surfaces 5c in the recess 6b in the projecting portion 6a of the light-diffusing layer 6. The gate 11b is located so that the runner 10 corresponding to the gate 11b is connected to the cutter blade-inserting slant surfaces 5c. The gate 11b serves to inject a resin into the interior cavity 11a. FIG. 7 shows that the primarily molded light-diffusing layer 6 is inserted into the mold 11 and shows a state before the transparent layer 5 is secondly molded in a space between the interior cavity 11a and the light-diffusing layer 6.

The proximal end 10a of the runner 10 on the molded product for the display member molded by the mold 11 is connected to the display member main body 2 at an area between the right and left cutter blade-inserting slant surfaces 5c. A lower side part of the proximal end 10a accords with an outer edge of the transparent layer 5. The gate 11b is set to be a position where an upper side part 10c of the proximal end 10a is located on an inner side end of the rear surface 5a of the transparent layer 5. A configuration of the gate 11b is set so that the distal end 10b of the runner 10 extends outward from the display member main body 2 along the extending direction D of the runner 10.

In the above embodiment, a width W2 of the runner 10 is constant, and a thickness t of the runner 10 is substantially constant except the proximal end 10a. However, a configuration of the gate 10b is set so that the thickness t decreases as the proximal end 10a extends upward. The width W2 of the runner 10 is smaller than the distance L1 between the two cutter blade-inserting slant surfaces 5c so that the width W1 of each cutter blade-inserting slant surface 5c can receive each blade of the nipper.

The recess 6b that is concaved upward is provided in a bottom surface of the light-diffusing layer 6 above an upper part (an inner side part) of the runner 10. An end (an upper end in FIG. 5) of the access permission slant surface 6c of the light-diffusing layer 6 at an inner side (an upper side in FIG. 5) of the proximal end 10a of the runner 10 is spaced apart from the proximal end 10a by a given distance in a direction perpendicular to a direction along a bottom surface 5f of the transparent layer 5.

The molded product for the display member is not limited to the two-colored formation. For example, a member that constitutes the light-diffusing layer 6 may be formed beforehand and then may be set in the mold, and under this condition the transparent layer 5 may be molded by injecting the resin.

(2) Cutting of the Runner 10

The runner 10 is cut out by a cutting means. For example, the cutting means may be a nipper (not shown) that has a pair of blades that can rotate about a common axis. At this time, since the proximal end 10a of the runner 10 is connected to the cutter blade-inserting slant surfaces Sc that are inclined at an angle θ (theta) with respect to the extending direction D of the runner 10, as shown in FIG. 5, each distal end of the nipper can be inclined in a direction along each cutter blade-inserting slant surface 5c. Consequently, it is possible to cut out the proximal end 10a of the runner 10 at a position E (a alternate long and short dash line in FIG. 5) along and near the cutter blade-inserting slant surfaces 5c. Thus, the remainder chip 10d cut out from the runner 10 exists slightly on an area backward from the cutter blade-inserting slant surfaces 5c. In an example shown in FIG. 5, the runner 10 extends directly downward from the bottom surface 5f of the transparent layer 5. However, as shown in FIG. 4, when the runner 10 is cut out at the position E, it is possible to set a thickness of an outer side end (a lower end) of the remainder chip 10d to be a zero so that the remainder chip 10d does not protrude downward from the bottom surface 5f of the transparent layer 5. It is also possible to set a thickness of the inner side end (an upper end) to be small.

Since the light-diffusing layer 6 is further provided in inner sides of the cutter blade-inserting slant surfaces 5c with the recess 6b that has the access permission slant surface 6c, it is possible to leave a clearance between the proximal end 10a of the runner 10 and a ceiling surface of the recess 6b. By utilizing the clearance as a space that permits the distal end of the nipper to enter, it is possible to use an intermediate portion in a longitudinal direction of the blade of the nipper or a portion at a side of the common axis over the intermediate portion (that is, a portion easy for cutting) in order to cut out the runner 10. Thus, it is possible to easily and positively cut out the runner 10. Furthermore, since the access permission slant surface 6c is provided on the light-diffusing layer 6, even if the projecting portion 5b of the transparent layer 5 is a thin thickness and it is difficult to provide the transparent layer 5 with the access permission slant surface, it is possible to provide the access permission slant surface 6c on the light-diffusing layer 6.

It is preferable that the slant angles θ (theta) of each rectangular cutter blade-inserting slant surface 5c and the rectangular access permission slant surface 6c are set to be more than 45 degrees with respect to the extending direction D of the runner 10 in a slant direction in which the upper edges of the slant surfaces 5c and 6c protrude backward over the lower edges of the slant surfaces 5c and 6c. These preferable angels can increase a projected area taken in the extending direction D than that taken in the rear side. Thus, it is possible to form the light-shielding layer 4 so that an uneven in thickness is not caused or it is extremely less with respect to the cut-out surface of the runner 10.

It will be preferable that the widths W1 of the cutter blade-inserting slant surfaces 5c and access permission slant surface 6e are set to be extremely greater than those of the blades of the nipper. This will enable the blades of the nipper to enter both sides of the proximal end 10a of the runner 10.

(3) Formation of the Light-Shielding Layer 4

Figure 8:
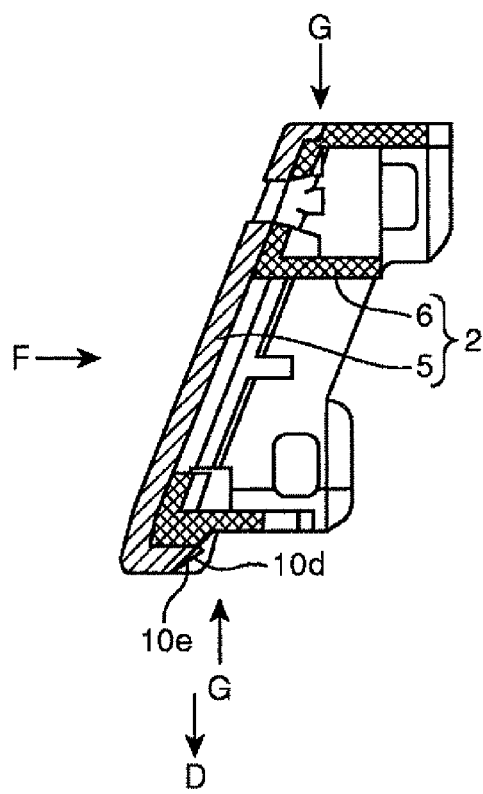
FIG. 8 is an explanatory view of a process for forming a light-shielding layer in the method of the present invention.
Figure 9:
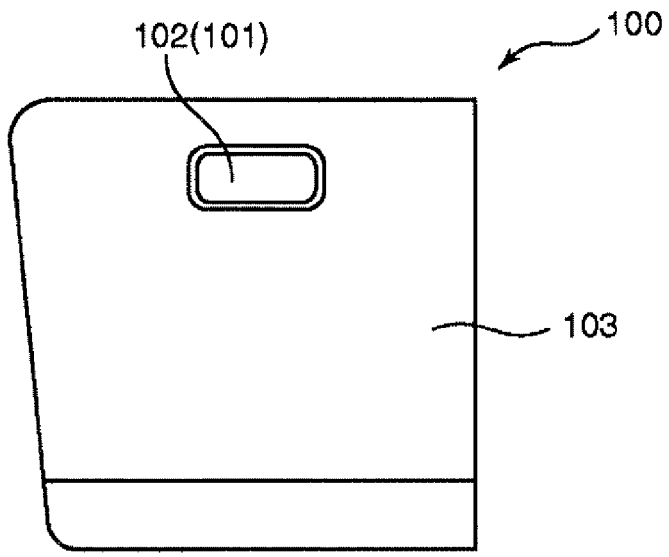
FIG. 9 is a front elevation view of a prior art display member.
Figure 10:
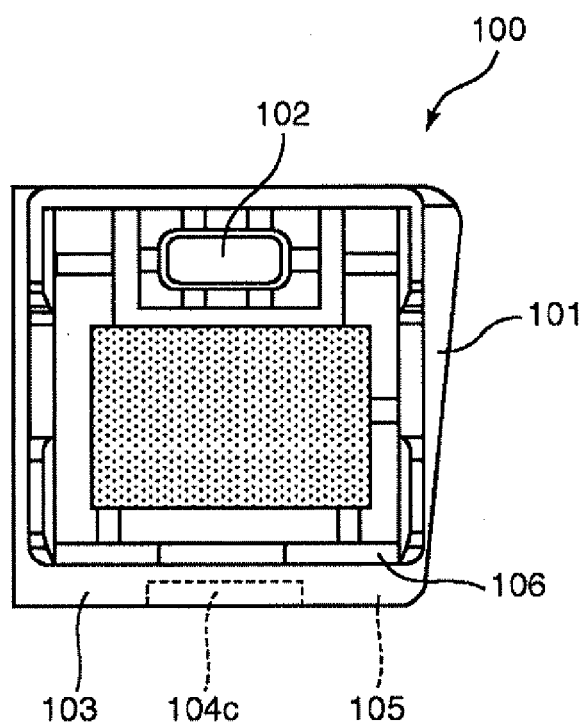
FIG. 10 is a rear side elevation view of the prior art display member shown in FIG. 9.
Figure 11:
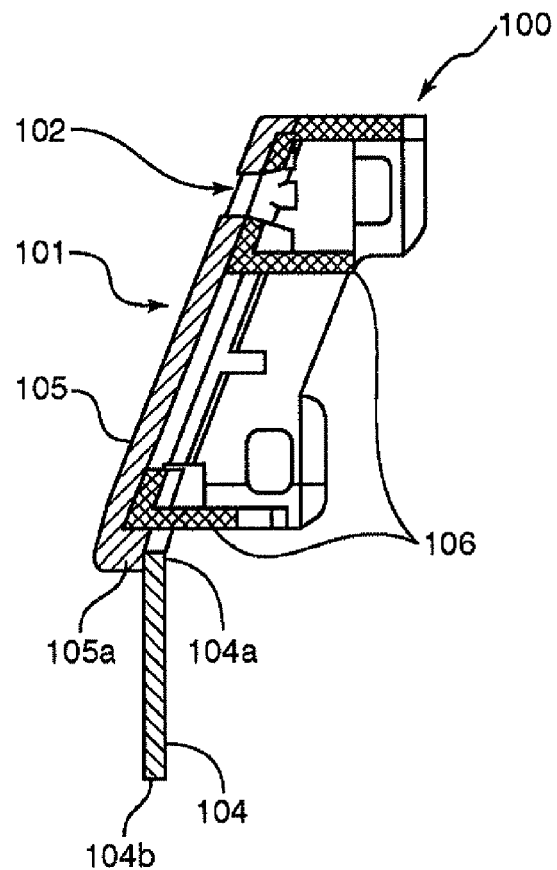
FIG. 11 is a cross section view of the prior art display member, illustrating the display member before a runner is cut out from the display member.
Figure 12:
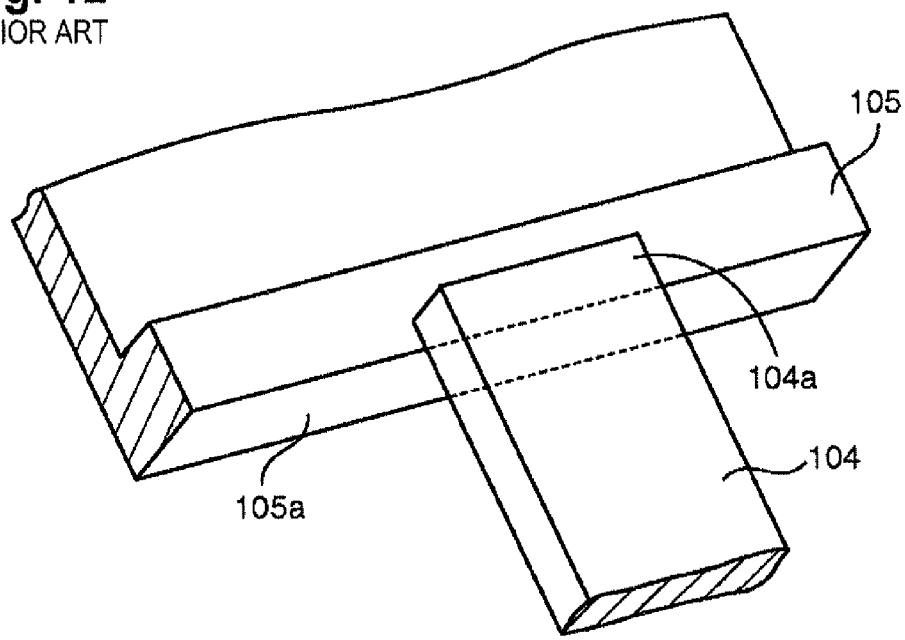
FIG. 12 is a perspective view of the prior art display member taken upward in a slanting direction in FIG. 11, illustrating the prior art display member before the runner is cut out from the display member.
Figure 13:
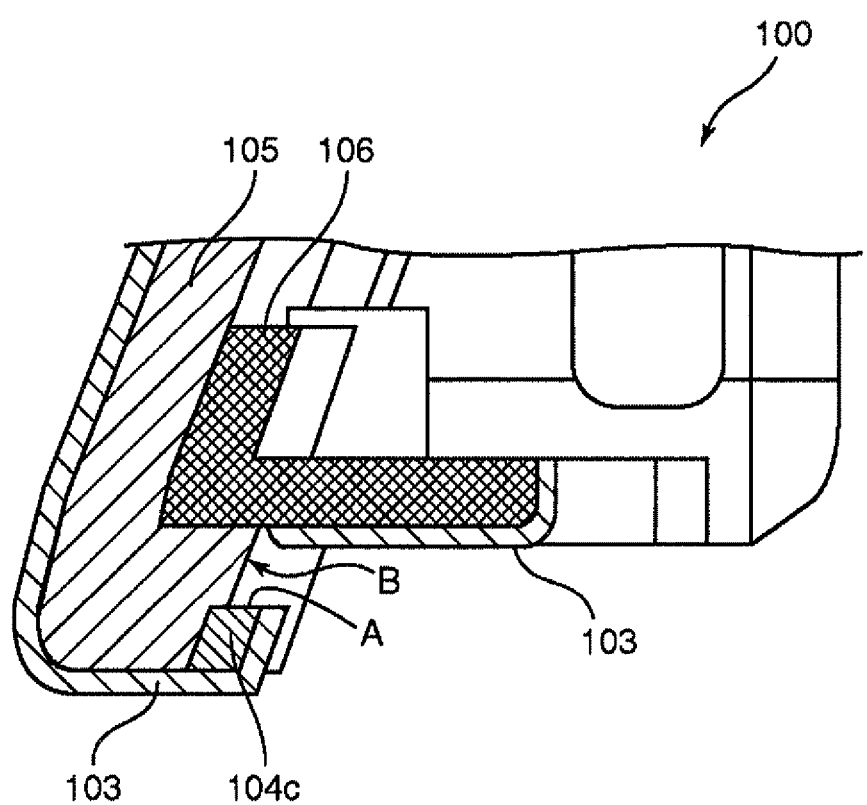
FIG. 13 is a partially enlarged cross section view of the prior art display member similar to FIG. 11, illustrating the prior art display member after the runner is cut out from the prior art display member.

As shown in FIG. 8, the light-shielding layer 4 is formed by spraying a light-shielding material onto a front surface (at a side shown by an arrow F) and a side surface (at a side shown by an arrow G) of the display member main body 2. The spraying operation onto the side surface of the display member main body 2 is carried out, for example, from four directions such as upper, lower, right, and left directions.

As described above, since a surface (a lower surface) 10e of the remainder chip 10d of the runner 10 is inclined downward from a horizontal direction by an angle of more than 45 degrees with respect to the extending direction D, the light-shielding layer 4 is formed on the lower surface 10e in a uniform condition or a less uneven condition. Since an inner side end portion (an upper end portion) of the remainder chip 10d exists slightly on each cutter blade-inserting slant surface 5c in a backward direction, that is, since a length of the remainder chip 10d in the backward direction is short, it is possible to eliminate a non-forming area of the light-shielding layer 4 at the inner side part of the chip 10d or to make the chip 10d extremely small even if the chip 10d is left.

Accordingly, it is possible for the present embodiment to restrain the lights from leaking from the remainder chip 10d and the portion around the remainder chip 10d.

The slant angles of the cutter blade-inserting slant surfaces 5c and access permission slant surface 6c may not be same to each other. The slant angles of the slant surfaces 5c and 6c may be set to be different from each other so long as the distal ends of the blades of the nipper can escape from the slant surface 6c and the light-shielding layer can be formed on the slant surface 6c.

Since the projection portion 5b of the transparent layer 5 is a thin thickness in the above embodiment, the transparent layer 5 is provided with the cutter blade-inserting slant surfaces 5c and the light-shielding layer 6 is provided with the access permission slant surface 6c. However, only the transparent layer 5 may be provided with the cutter blade-inserting slant surfaces 5c and access permission slant surface 6c in the case where the projecting portion 5b is a large thickness. In this case, it is preferable that the proximal end 10a of the runner 10 is located at a slightly lower position from an upper end of the cutter blade-inserting slant surfaces 5c.

The means for cutting out the runner 10 is not limited to the nipper. For example, scissors or the like that have a pair of blades that turns about a common axis may be used as the cutting means.

Although an operation button for an audio unit to be mounted on a motor vehicle is produced as the display member in the embodiment described above, aspects of the disclosed exemplary embodiments can be applied to a method for producing another display member (for example, a display member of an operation button provided on various kinds of instruments such as an instrument panel or an audio unit to be mounted on a motor vehicle).

As described above, the exemplary embodiments relates to a display member and a method for producing the display member, the display member including a display member main body that has a transparent layer located on a display side and a light-diffusing layer located on a rear side of the transparent layer, and a light-shielding layer located on a front side of the display member main body except a display window. Also, the exemplary embodiments relates to a method for producing the display member that can restrain the lights from leaking from a remainder chip of a runner and a portion around the remainder chip, and relates to a molded product for a display member suitable for the method.

A method for producing a display member in accordance with exemplary embodiments comprises the steps of: molding a transparent layer by injecting a resin into a mold having a gate through the gate under a condition that a member constituting a light-diffusing layer is disposed in the mold, and providing the transparent layer with slant surfaces each having an slant angle of more than 45 degrees with respect to an extending direction of a runner that extends sideward from a rear surface of the transparent layer in correspondence with the gate, the slant surfaces being provided around a portion on a rear surface of the transparent layer to which the runner is connected and being inclined so that an inner side end of each of the slant surfaces is located at a rear side from an outer side end of the portion; removing the display member main body from the mold, and cutting out the runner at a position along and near the slant surfaces by using a cutting means having a pair of blades that rotate about a common axis; and forming a shielding layer on at least a front surface of the display member main body and on a rear surface of the transparent layer inside a remainder chip of the runner by spraying a light-shielding material except the display window from a front side of the display member main body and a direction parallel to the extending direction of the runner.

According to the method, in the molding step of the method, the display member main body is molded by using the mold having the gate. The rear surface of the transparent layer to which the runner is connected in corresponding with the gate is provided on a portion around the runner with the slant surfaces that have the slant angles of more than 45 degrees. In the next cutting step, after the display member main body is removed from the mold, the runner connected to the display member main body is cut out by using the cutting means having the pair of blades that rotate about the common axis. Even if any remainder chip of the runner is left on the transparent layer due to cutting of the runner, an amount of the remainder chip that protrudes backward is a little. Furthermore, in the forming step of the light-shielding layer, since a cut-out surface of the remainder chip is inclined by an slant angle of more than 45 degrees with respect to the extending direction of the runner before the runner is cut out and a projected area of the cut-out surface taken from the extending direction is greater than that taken from a rear side, it is possible to form the light-shielding layer having a uniform thickness or an extremely less uneven thickness on the transparent layer even if the light-shielding material is sprayed onto the transparent layer from a direction parallel to the extending direction of the runner. Since a backward projecting length of the remainder chip of the runner is small, it is possible to eliminate the non-forming area of the light-shielding layer and it is possible to make the non-forming area extremely small. Accordingly, it is possible to restrain the light from leaking from the remainder chip of the runner and the portion around the remainder chip. The light-shielding layer on the front surface of the display member main body becomes a uniform thickness or an extremely less uneven thickness by spraying the light-shielding material on the transparent layer from the front side of the display member main body.

It is preferable in the method that the transparent layer is provided at right and left outsides on the portion, to which the runner is connected, with cutter blade-inserting slant surfaces as the slant surfaces so that the blades of the cutting means can enter inward from side parts of the runner. To form the cutter blade-inserting slant surfaces enables the blades of the cutting means to enter along the slant surfaces, thereby substantially enabling the blades to be inclined along the slant surfaces.

It is further preferable that the light-diffusing layer is further provided at an inside of the portion, to which the runner is connected, with an access permission slant surface as one of the slant surfaces so that a distal end of the cutting means can enter. When the distal end of the cutting means enters the access permission slant surface, it is possible to use a central part in a longitudinal direction of each blade or a sharp portion at a proximal end of each blade, thereby easily and positively effecting a cutting action.

Specifically, it is preferably that a part of the light-diffusing layer is located inside the portion to which the runner is connected, the light-diffusing layer is provided in a part with a recess having a side surface connected to the cutter blade-inserting slant surfaces, the side surface of the recess connected to the cutter blade-inserting slant surfaces defines the access permission slant surface. According to the method, even if there is no special-purpose space for forming the access permission slant surface on the rear surface of the transparent layer, it is possible to provide the access permission slant layer by utilizing the side surface of the recess.

A molded product for a display member in accordance with exemplary embodiments is molded by using a mold having a gate for injecting a resin and includes a transparent layer and a light-diffusing layer formed on a rear side of the transparent layer. The molded product comprises: a runner molded in correspondence with the gate and extending sideward from a rear surface of the transparent layer; and slant surfaces formed around a portion on the rear surface of the transparent layer to which the runner is connected, each of the slant surfaces having an slant angle of more than 45 degrees with respect to an extending direction of a runner, and an inside of the slant surfaces protrudes backward from an outer side end of the portion. The slant surfaces enable the cutting means to cut out the runner along and near the slant surfaces. Even if the remainder chip of the runner is left on the transparent layer by the cutting action, an amount of the remainder chip that protrudes from the rear surface of the transparent layer is little.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain principles and practical applications of the invention, and to thereby enable others skilled in the art to best utilize the invention and various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims of the present invention.

The invention claimed is:

1. A method for producing a display member including a display member main body that has a transparent layer and a light-diffusing layer located on a rear side of said transparent layer, and a light-shielding layer located on a front side of said display member main body except a display window, comprising the steps of:

molding said transparent layer by injecting a resin into a mold, the mold having a gate, through said gate under a condition that a member constituting said light-diffusing layer is first disposed in said mold, and providing said transparent layer with slant surfaces each having an slant angle of more than 45 degrees with respect to an extending direction of a runner that extends sideward from a rear surface of said transparent layer in correspondence with said gate, said slant surfaces being provided around a portion on said rear surface of said transparent layer to which said runner is connected and being inclined so that an inner side end of each of said slant surfaces is located at a rear side from an outer side end of said portion;

removing said display member main body from said mold, and cutting out said runner at a position along and near said slant surfaces by using a cutting device having a pair of blades that rotate about a common axis; and forming said shielding layer on at least a front surface of said display member main body and on a rear surface of said transparent layer inside a remainder chip of said runner by spraying a light-shielding material except on said display window from a front side of said display member main body and in a direction parallel to said extending direction of said runner.

2. A method for producing a display member according to claim 1, wherein said transparent layer is provided at right and left outsides on said portion, to which said runner is connected, with cutter blade-inserting slant surfaces as said slant surfaces so that said blades of said cutting device can enter inward from side parts of said runner.

3. A method for producing a display member according to claim 2, wherein said light-diffusing layer is further provided at an inside of said portion, to which said runner is connected, with an access permission slant surface as one of said slant surfaces so that a distal end of said cutting device can enter.

4. A method for producing a display member according to claim 3, wherein a part of said light-diffusing layer is located inside said portion to which said runner is connected, said light-diffusing layer is provided in a part with a recess having a side surface connected to said cutter blade-inserting slant surfaces, said side surface of said recess connected to said cutter blade-inserting slant surfaces defines said access permission slant surface.

5. A molded product for a display member wherein said molded product is molded by using a mold having a gate for injecting a resin and includes a transparent layer and a light-diffusing layer formed on a rear side of said transparent layer, said molded product comprising:

a runner molded in correspondence with said gate and extending sideward from a rear surface of said transparent layer; and slant surfaces formed around a portion on said rear surface of said transparent layer to which said runner is connected, each of said slant surfaces having an slant angle of more than 45 degrees with respect to an extending direction of a runner, and an inside of said slant surfaces protrudes backward from an outer side end of said portion.

* * * * *